United States Patent
Urano et al.

(10) Patent No.: US 11,144,053 B2
(45) Date of Patent: Oct. 12, 2021

(54) CONTROLLING DRIVING CONDITION COMPONENTS OF AN AUTONOMOUS VEHICLE BASED ON A CURRENT DRIVING MODE AND CURRENT CONDITIONS

(71) Applicant: TOYOTA RESEARCH INSTITUTE, INC., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 165 days.

(21) Appl. No.: 16/375,610

(22) Filed: Apr. 4, 2019

(65) Prior Publication Data

US 2020/0319636 A1 Oct. 8, 2020

(51) Int. Cl.
*G05D 1/00* (2006.01)
*B60W 10/30* (2006.01)
*B60W 50/00* (2006.01)

(52) U.S. Cl.
CPC .......... *G05D 1/0061* (2013.01); *B60W 10/30* (2013.01); *B60W 50/0098* (2013.01); *B60W 2710/30* (2013.01)

(58) Field of Classification Search
CPC ............. B60W 10/30; B60W 50/0098; B60W 2710/30; G05D 1/0061
See application file for complete search history.

(56) References Cited

U.S. PATENT DOCUMENTS

| | | | |
|---|---|---|---|
| 8,880,270 B1* | 11/2014 | Ferguson | B60W 30/00 701/23 |
| 9,409,549 B2 | 8/2016 | Yopp et al. | |
| 9,587,952 B1* | 3/2017 | Slusar | G01C 21/3492 |
| 2009/0015203 A1* | 1/2009 | Oakes | G05B 15/02 320/132 |
| 2014/0309806 A1* | 10/2014 | Ricci | G06F 21/32 701/1 |
| 2015/0149017 A1* | 5/2015 | Attard | B60W 30/18163 701/23 |
| 2015/0203107 A1* | 7/2015 | Lippman | B60W 30/16 701/23 |
| 2016/0026182 A1* | 1/2016 | Boroditsky | H04L 67/10 701/23 |
| 2018/0046183 A1 | 2/2018 | Peters et al. | |
| 2018/0118219 A1* | 5/2018 | Hiei | B60W 50/14 |
| 2018/0229692 A1* | 8/2018 | Li | B60S 1/0818 |

(Continued)

FOREIGN PATENT DOCUMENTS

| | | |
|---|---|---|
| CN | 201751249 U | 2/2011 |
| JP | 2004268790 A | 9/2004 |
| KR | 101315708 B1 | 10/2013 |

*Primary Examiner* — Mussa A Shaawat
(74) *Attorney, Agent, or Firm* — Seyfarth Shaw LLP

(57) ABSTRACT

A method for controlling a driving condition component of an autonomous vehicle is presented. The method includes determining whether current conditions would limit a driver's visibility. The method also includes predicting whether the driver will enable a manual mode during the current conditions. The method further includes controlling the driving condition component to mitigate the current conditions prior to the driver enabling the manual mode.

20 Claims, 5 Drawing Sheets

(56) References Cited

U.S. PATENT DOCUMENTS

| | | | | |
|---|---|---|---|---|
| 2018/0356817 A1* | 12/2018 | Poeppel | ............... | G05D 1/0061 |
| 2019/0049954 A1* | 2/2019 | Mitchell | ............... | G05D 1/0297 |
| 2019/0049981 A1* | 2/2019 | Fischer | ................ | B60W 50/10 |
| 2019/0220008 A1* | 7/2019 | Mizuno | ............... | B60W 30/146 |
| 2019/0384994 A1* | 12/2019 | Frossard | .............. | G06N 3/0454 |
| 2020/0001889 A1* | 1/2020 | Niu | ....................... | B60W 10/20 |
| 2020/0103980 A1* | 4/2020 | Katz | ........................ | G06F 3/167 |
| 2020/0139992 A1* | 5/2020 | Oba | ....................... | B60W 30/18 |
| 2020/0207366 A1* | 7/2020 | Kapuria | ................. | B60W 50/14 |
| 2020/0231182 A1* | 7/2020 | Oba | ....................... | B60W 40/09 |
| 2020/0269861 A1* | 8/2020 | Liftman | ............... | G05D 1/0276 |
| 2020/0396101 A1* | 12/2020 | Wasilczyk | .............. | G06F 9/541 |

\* cited by examiner

CONTROLLING DRIVING CONDITION COMPONENTS OF AN AUTONOMOUS VEHICLE BASED ON A CURRENT DRIVING MODE AND CURRENT CONDITIONS

BACKGROUND

Field

Certain aspects of the present disclosure generally relate to controlling driving condition components and, more particularly, to a system and method for controlling driving condition components of an autonomous vehicle based on a current driving mode and current conditions.

Background

Vehicles include various components, such as a heater, an air conditioner (AC), windshield wipers, and a window defroster, to improve a passenger's comfort and driving conditions. Different vehicles may have different interfaces for the components. Therefore, when entering a new vehicle, a passenger may be unfamiliar with the interface. In some conventional vehicles, driving condition components, such as windshield wipers and window defrosters, are enabled when the vehicle detects a trigger condition, such as rain, snow, or foggy windows.

For non-autonomous vehicles (e.g., manually operated vehicles), driving condition components may be enabled in response to a trigger to improve driving conditions for a driver. In contrast, for an autonomous vehicle, the driving condition components may be limited to improving passenger comfort. That is, driving condition components are not used to improve driving conditions when the vehicle is autonomously operated. Nonetheless, as some autonomous vehicles may be manually operated, there is a need to improve driving condition components for autonomous vehicles.

SUMMARY

In one aspect of the present disclosure, a method for controlling a driving condition component of an autonomous vehicle is disclosed. The method includes determining whether current conditions would limit a driver's visibility. The method also includes predicting whether the driver will enable a manual mode during the current conditions. The method further includes controlling the driving condition component to mitigate the current conditions prior to the driver enabling the manual mode.

In another aspect of the present disclosure, a non-transitory computer-readable medium with non-transitory program code recorded thereon is disclosed. The program code is for controlling a driving condition component of an autonomous vehicle. The program code is executed by a processor and includes program code to determine whether current conditions would limit a driver's visibility. The program code also includes program code to predict whether the driver will enable a manual mode during the current conditions. The program code further includes program code to control the driving condition component to mitigate the current conditions prior to the driver enabling the manual mode.

Another aspect of the present disclosure is directed to an apparatus for controlling a driving condition component of an autonomous vehicle. The apparatus having a memory and one or more processors coupled to the memory. The processor(s) is configured to determine whether current conditions would limit a driver's visibility. The processor(s) is also configured to predict whether the driver will enable a manual mode during the current conditions. The processor(s) is further configured to control the driving condition component to mitigate the current conditions prior to the driver enabling the manual mode.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Vehicles include various driving condition components and comfort components, such as a heater, an air conditioner (AC), and a defroster to improve passenger comfort and/or driving conditions. The interface for the components may vary among vehicle brands, as well as among vehicles within a same brand. Due to the diversity in interfaces, a passenger may be unfamiliar with an interface when entering a new vehicle. Additionally, in ride share vehicles, such as a taxi, the passenger typically sits in one of the rear seats, thereby limiting their access to the interface.

Figure 1A:
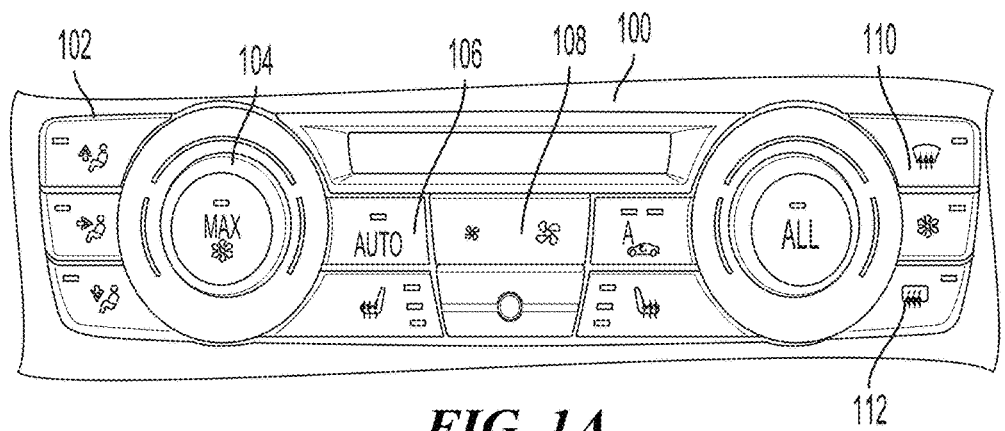
FIGS. 1A, 1B, and 1C illustrate examples of interfaces for controlling comfort components and driving condition components according to aspects of the present disclosure.
Figure 1B:
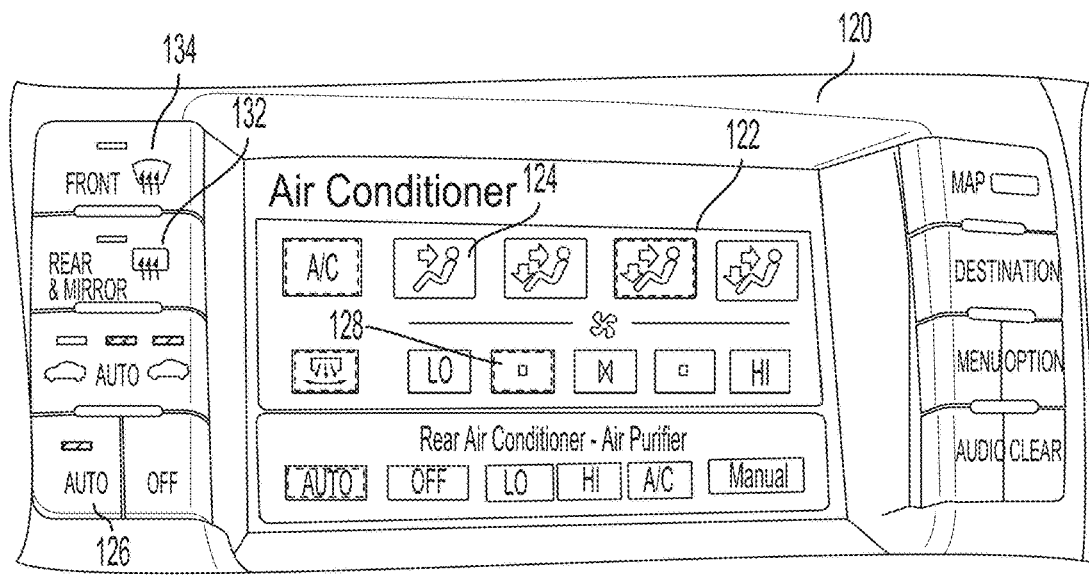
Figure 1C:
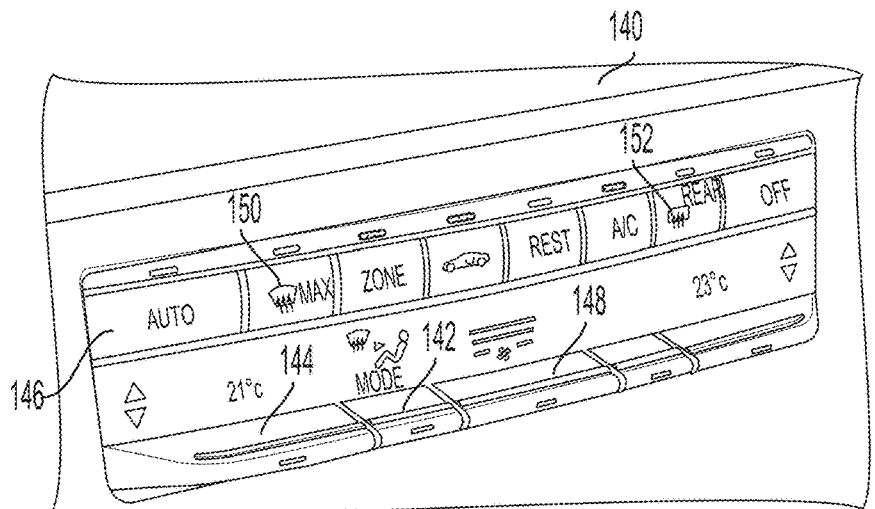

FIGS. 1A, 1B, and 1C illustrate examples of different interfaces 100, 120, 140 for components of a first vehicle, second vehicle, and third vehicle. As shown in FIGS. 1A, 1B, and 1C, the layout of the interfaces 100, 120, 140 is different in each vehicle. For example, as shown in FIG. 1A, the interface 100 includes an air direction controller 102, a temperature controller 104, an auto climate controller 106, a fan speed controller 108, a front defrost controller 110, and a rear defrost controller 112.

In another example, as shown in FIG. 1B, the interface 120 includes a touchscreen 122. The interface 120 of the second vehicle includes an air direction controller 124, an auto climate controller 126, a fan speed controller 128, a front defrost controller 134, and a rear defrost controller 132. The interface 120 of the second vehicle does not include a temperature controller. Although the temperature controller may be accessible via one of the screens displayed on the touchscreen 122, it may be difficult for a passenger to find the temperature controller if it is their first time in the second vehicle.

In another example, as shown in FIG. 1C, the interface 140 of the third vehicle includes an air direction controller 142, a temperature controller 144, an auto climate controller 146, a fan speed controller 148, a front defrost controller 150, and a rear defrost controller 152. As shown in FIG. 1C, the interface 140 of the third vehicle is different from the interfaces 100, 120 of the first and second vehicles. Additionally, as shown in FIG. 1B, the interface 120 of the second vehicle is different from the interfaces 100, 140 of the first and third vehicles.

When a vehicle is manually operated, environmental conditions (e.g., rain or snow) or cabin conditions (e.g., foggy windows) may reduce visibility. Specifically, the environmental conditions and/or cabin conditions may obstruct a driver's view from one or more windows, such as the windshield. As such, a controller to enable driving condition components, such as window defroster or windshield wipers, should be readily accessible to the driver. Because each vehicle may have a different interface 100, 120, 140, it may be difficult for a driver to adjust driving condition components.

In some conventional vehicles, driving condition components, such as windshield wipers and window defrosters, are activated when a sensor detects a trigger condition, such as rain or foggy windows. For example, a rain sensor on a windshield may detect water and activate the windshield wipers. As another example, a window sensor or an internal vision sensor may detect a foggy window and activate a window defroster.

Enabling driving condition components in response to a trigger improves driving conditions during manual operation. Still, autonomous vehicles are operated based on data captured from multiple sensors, such as radio detection and ranging (RADAR), light detection and ranging (LIDAR), red-green-blue (RGB) cameras, and other types of sensors. For improved visibility, the sensors may be defined on exterior portions of the vehicle, such as the roof, front bumper, rear bumper, side mirrors, front grill, etc. As such, during autonomous operation, the driving condition components may not affect the vehicle's ability to navigate through an environment.

To improve battery life and to reduce wear and tear, during autonomous operation, driving condition components may not be activated in response to environmental conditions and/or cabin conditions. Nonetheless, the driving condition components may still be manually controlled by a passenger. For example, a passenger may defrost a window to view the vehicle's surroundings.

Autonomous vehicles may operate in an autonomous mode or a manual mode. In the manual mode, a human driver manually operates the vehicle. In some cases, due to environmental and/or cabin conditions, the windows may not be clear. Thus, it may be unsafe to transition from the autonomous mode to the manual mode. There is a need to improve autonomous vehicles by providing a system to anticipate manual operation and mitigate environmental and/or cabin conditions (e.g., unclear windows) prior to the manual operation.

Aspects of the present disclosure are directed to controlling driving condition components of an autonomous vehicle based on a predicted driving mode and current conditions. As a result, the windows are cleared prior to manual operation and power consumption is reduced during autonomous operation. The autonomous vehicle may be a mobility-as-a-service (MAAS) vehicle (e.g., ride share vehicle) or a personally owned vehicle. The autonomous vehicle includes a manual mode for manual operation by a human driver. The autonomous vehicle may be referred to as a vehicle.

Figure 2:
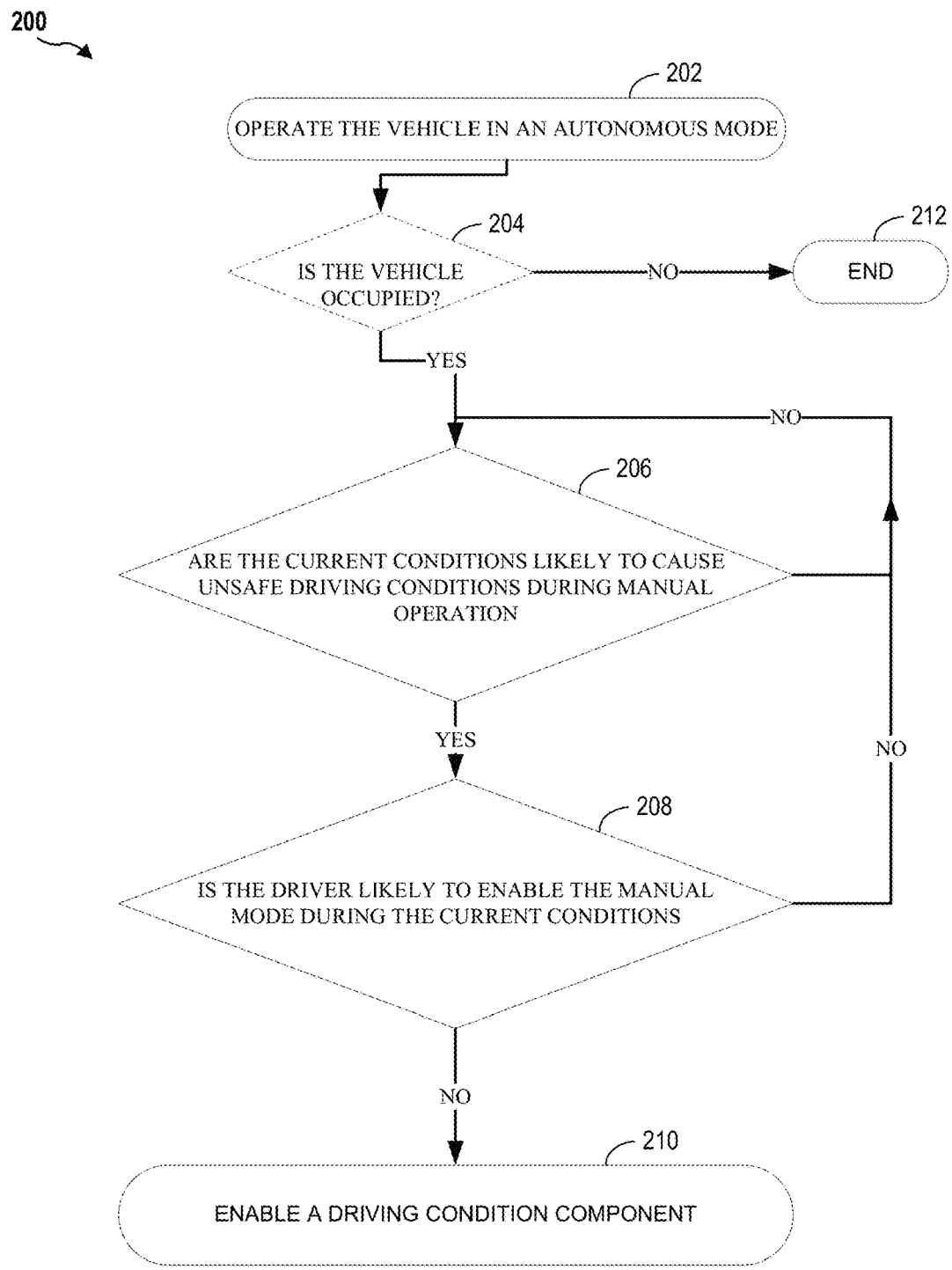
FIG. 2 illustrates an example of a flow diagram for controlling driving condition components of a vehicle based on a predicted driving mode and current conditions according to aspects of the present disclosure.

FIG. 2 illustrates an example of a flowchart 200 for controlling driving condition components of a vehicle based on a predicted driving mode and current conditions. As shown in FIG. 2, at block 202, the vehicle is operated in an autonomous mode. In an optional configuration, at block 204, a driving condition system determines if the vehicle is occupied. The vehicle's occupancy may be determined from one or more sensors, such as an internal vision sensor (e.g., RGB camera) for capturing an occupant's image, a seat pressure sensor for sensing an occupant on a seat, a door sensor for sensing the opening and closing of a door, or other sensors. If the vehicle is not occupied, the operation ends (block 212).

If the vehicle is occupied, the driving condition system determines if the current conditions are likely to cause unsafe driving conditions during manual operation (block 206). The current conditions include cabin conditions (e.g., foggy windows) and/or environmental conditions (e.g., rain). One or more sensors may be used to detect the current conditions. For example, a vision sensor may identify foggy windows or rain. As another example, a moisture sensor may also be used to detect rain or foggy windows.

The current conditions may also include potential cabin conditions and/or potential environmental conditions. For example, internal sensors may measure cabin humidity and/or temperature, and external sensors may measure external temperature and/or humidity. The driving condition system may determine a potential condition that is based on the current external and internal measurements. For example, based on the internal humidity, internal temperature, and external temperature, the driving condition system may identify a potential for foggy windows. The driving condition system may also determine a possibility of environmental conditions, such as rain or snow, based on weather reports, humidity, temperature, etc.

If the current conditions cause unsafe conditions for manual operation (e.g., reduced visibility), the driving condition system predicts whether the driver is likely to enable the manual mode during the current conditions (block 208). Based on weather data and sensor data, the driving condition system determines a duration for the current conditions. The driving condition system predicts a likelihood of the driver enabling the manual mode based on the passenger's known driving habits, a reservation type, a distance to a destination, resources (e.g., battery level), environmental factors, road hazards, unmapped areas, out-of-date maps, sensor failure conditions, etc. That is, the prediction may be based on areas where the vehicle may stall during the autonomous operation. The prediction is also based on the passenger's driving habits.

In one example, a personal vehicle may be driven by multiple drivers. A first driver may prefer autonomous operation and a second driver may prefer manual operation. In this example, the driving condition system identifies the current driver to determine the likelihood of the driver enabling manual operation. Specifically, if the second driver is currently driving, the driving condition system determines there is an increased likelihood of manual operation. As another example, for an MAAS vehicle, a passenger may reserve the vehicle for manual operation or autonomous operation. The type of reservation may be used to determine whether the passenger will enable manual operation. In the noted examples, the vehicle may be in an autonomous mode. Still, the driver may have indicated a preference for manual operation. Thus, the prediction may be based on the indicated preference.

As discussed, the prediction may be based on areas where the vehicle may stall during the autonomous operation. The stall factors may include low resources (e.g., battery), wireless signal strength being less than a threshold, environmental conditions, road hazards, unmapped areas, out-of-date maps, accidents, sensor failure conditions, etc. In one example, if the battery level is less than a threshold, the vehicle may switch to a gas engine backup. In this example, to conserve battery power, the autonomous operation may switch to the manual operation.

As another example, the vehicle may stall in areas with potential sensor failure conditions. For example, vehicle sensors (e.g., cameras) used to detect traffic light colors may fail to detect a color if an angle of the sun is within a certain range. As another example, LIDAR sensors may not function in rain or fog. In yet another example, the vehicle may lose track of its position if the route includes areas with limited signals or no signals, such as a tunnel. The signals may include different communication signals, such as a global positioning system (GPS) signal, a wireless Internet signal, a cellular signal, etc.

The stall factors may also include environmental conditions. For the sensors, such as a camera, the driving condition system may determine backlight conditions, vehicle direction, traffic light locations, intersection arrival times, an angle of sun, weather, building information (e.g., whether buildings block the sun), etc. The aforementioned information, such as the sun's angle, may be included in the vehicle's stored map data. The information may also be obtained from the Internet or other data sources.

For a LIDAR sensor, and other sensors, weather conditions, such as humidity, may cause sensor failure. Thus, the driving condition system may estimate various weather conditions, such as humidity, based on available weather information. The driving condition system may also consider the time of day and/or the travel duration. For a GPS sensor, and other sensors, a weak signal or an interrupted signal may cause sensor failure. Thus, the driving condition system may estimate signal strength for a route. The signal strength may be estimated based on, for example, building information (e.g., height and location), tunnel locations, terrain information (e.g., a height of surrounding mountains), a number of satellites, satellite positions, a number of cell towers, a number of WiFi transceivers, etc. The information may be stored in the map data.

In one configuration, the driving condition system determines if a stall factor is greater than or less than a threshold. For example, if the amount of rain is greater than a rain threshold, the rain is determined to be a stall factor. If the rain is less than a threshold, the rain is not considered a stall factor. In another example, if buildings and/or surrounding environmental features cause a cellular signal to be less than a threshold, the buildings and/or surrounding environmental features are stall factors. If the cellular signal is greater than a threshold in view of the buildings and/or surrounding environmental features, the aforementioned elements are not risk factors. In one configuration, a customer cannot override or ignore considerations of whether a particular route may include a stall factor.

Additionally, the distance to the destination may be used to predict a likelihood of the driver enabling the manual mode. In some locations, such as, for example, a residential area or an office parking lot, the driver may prefer to manually operate the vehicle. That is, it may be easier to navigate through a parking lot to find a preferred spot while operating the vehicle in a manual mode in comparison to an autonomous mode. Thus, if the distance to the destination is less than a threshold, the driving condition system may predict that it is likely for the driver to enable the manual mode.

The factors discussed above may be considered as a whole to determine a value for the likelihood of manual operation. Different factors may receive different weights. For example, the driver's known preference may be weighed greater than a low cellular signal. The determined value may be compared to a threshold. If the value is greater than the threshold, the driving condition system determines that manual operation is likely. If the value is less than the threshold, the driving condition system determines that the manual operation is not likely.

In one configuration, the driving condition system may limit the prediction to a certain time period (e.g., five minutes) from the current time. Limiting the prediction to a time period may improve an accuracy of the prediction. That is, as the time period extends, there is an increased likelihood for unforeseen factors to cause the driver to enable manual operation. Limiting the likelihood of unforeseen factors increases the accuracy of the predictions.

As shown in FIG. 2, if manual operation is likely, the driving condition system enables a driving condition component (e.g., windshield wipers, window defroster) to mitigate the current conditions (block 210). The driving condition component may be enabled until the current conditions are resolved and/or until potential conditions are resolved. Manual operation cannot be enabled until the current conditions are resolved (e.g., the windshield is cleared). If manual operation is not likely, the driving condition system continues to monitor the current conditions (block 206). The driving condition system may monitor the current conditions according to an interval. Alternatively, the driving condition system may continuously monitor the current conditions.

Aspects of the present disclosure are directed to mitigating unsafe driving conditions prior to enabling a manual mode. In one configuration, the manual mode cannot be enabled until the unsafe driving conditions are resolved. As previously discussed, the driving condition system may predict when a driver will enable the manual mode. Still, in some cases, the prediction may not be accurate or the driver enables manual mode on a whim.

Upon receiving an input to enable manual mode, the driving condition system assesses the current conditions (e.g., weather, window status, etc.). If the current conditions are unsafe for manual operation, the driving condition system may notify the driver that manual operation cannot be performed until the current conditions are resolved. Furthermore, the driving condition system enables a driving condition component to resolve the current conditions. For example, the driving condition system enables a window defroster to clear a foggy windshield. Upon determining that the current conditions are resolved, the driving condition system may enable the manual mode. Alternatively, the driving condition system notifies the driver that the manual mode may be enabled.

Figure 3:
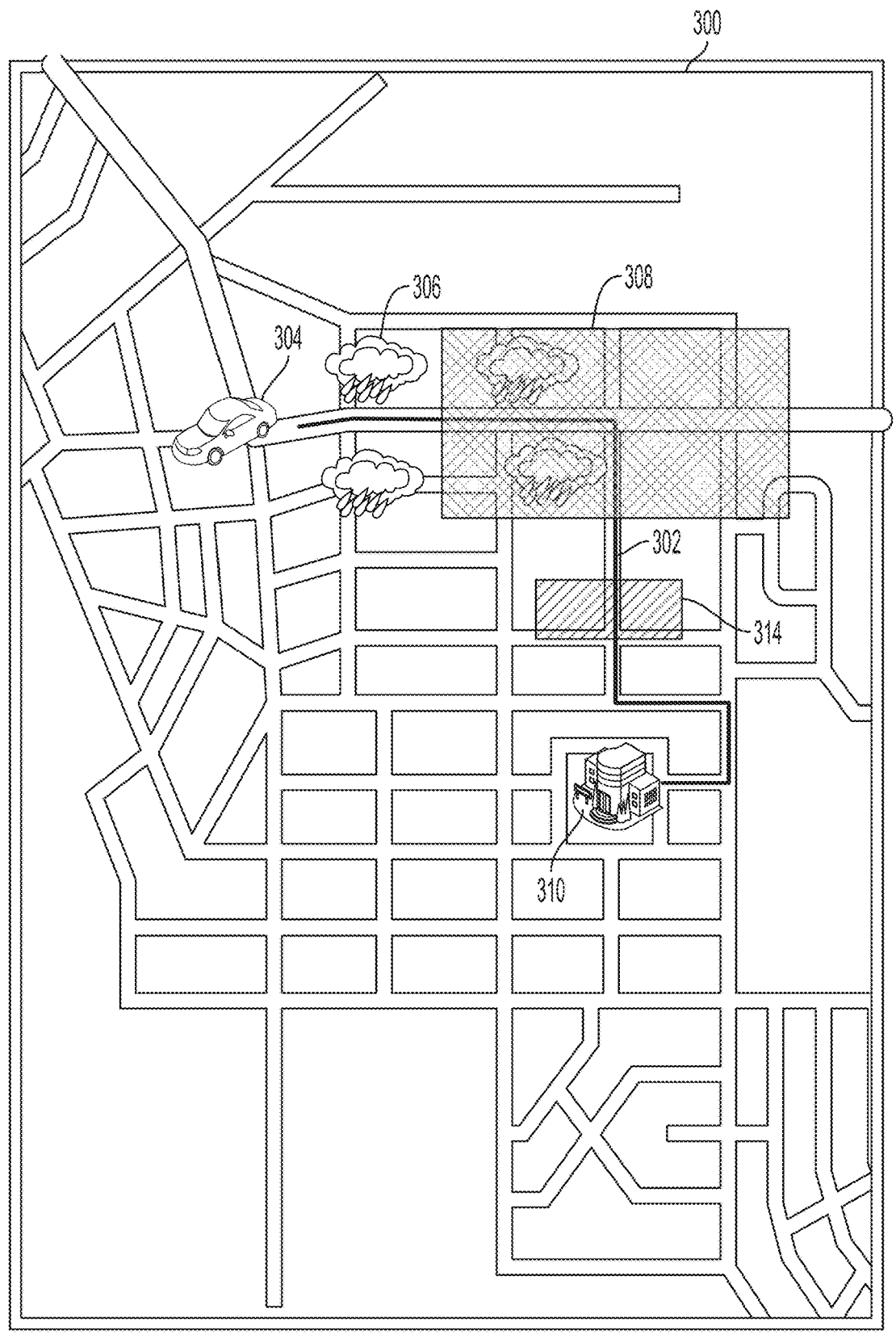
FIG. 3 illustrates an example of enabling a driving condition component based on a predicted manual operation according to aspects of the present disclosure.

FIG. 3 illustrates an example of enabling a driving condition component based on a predicted manual operation according to aspects of the present disclosure. As shown in FIG. 3, a vehicle 304 may start a route 302 in an area 300. A driving condition system may be aware of an entire route 302 or a portion of the route 302. In this example, a portion of the area 300 includes rain 306.

Furthermore, the area 300 includes an outdated map section 308. The outdated map section 308 refers to a portion of the area 300 where a time since a last map update is greater than a threshold. The outdated map section 308 may also refer to an area without map information, such as an area with private roads. The vehicle 304 may have difficulties navigating through the outdated map section 308 in an autonomous mode. In one configuration, prior to entering the outdated map section 308, the vehicle 304 warns the driver of the potential stall, such that the driver may enable the manual mode. In another configuration, prior to entering the outdated map section 308, the vehicle 304 warns the driver that the manual mode will be enabled within a certain time period.

In this example, the vehicle 304 may be an MAAS vehicle that receives a reservation from a customer requesting to be dropped off at an office 310. Alternatively, the vehicle 304 may be a personal vehicle and the driver has entered the office 310 as the destination. In both cases, the vehicle 304 is intended to autonomously navigate the route 302. Upon receiving the destination, the vehicle 304 (e.g., the vehicle's 304 navigation system) determines the route 302 to the office 310.

In one configuration, prior to navigating the route 302, the driving condition system determines that there is rain 306 on a portion of the route 302. As such, due to the rain 306 (e.g., stall factor), there is a potential for stalling on the route 302. The rain 306 may cause sensor failure due to the wet conditions. The driving condition system may also determine if the amount of rain 306 is greater than a threshold. In the present example, the rain 306 is less than the threshold, therefore, the stall factor is negligible. As such, the rain 306 does not increase a likelihood for manual operation.

Still, because the rain 306 may cause unsafe driving conditions during manual operation, the driving condition system determines if other factors may increase or cause a likelihood of manual operation (e.g., enabling a manual mode) during the portion of the route 302 with rain 306. In this example, the area of rain 306 overlaps with the outdated map section 308. As such, the likelihood of manual operation is greater than a threshold because the vehicle 304 may have difficulties navigating the outdated map section 308 in an autonomous mode. Therefore, prior to entering the outdated map section 308, the driving condition system enables a driving condition component (e.g., windshield wipers) to clear the windshield.

In another configuration, the driving condition system determines current conditions after the vehicle 304 begins operating in the autonomous mode. In this configuration, when the vehicle 304 starts navigating the route 302, the driving condition system monitors the current conditions at an interval. In this example, the driving condition system detects rain 306 at the start of the route 302.

Upon detecting the rain 306, the driving condition system may determine a duration of the rain 306. The driving condition system may also predict if a driver will enable the manual mode during a portion of the route 302 with rain 306. As discussed, the area of rain 306 overlaps with the outdated map section 308. As such, the driving condition system predicts the driver will enable the manual mode at, or prior to, entering the outdated map section 308. Therefore, prior to entering the outdated map section 308, the driving condition system enables a driving condition component (e.g., windshield wipers) to clear the windshield.

In one configuration, the driving condition system disables the driving condition component after the condition has ended or after the condition has been resolved. For example, a window defroster may be disabled when the windows have been cleared. As another example, the windshield wipers may be disabled when the rain 306 stops or when the vehicle 304 leaves the area with the rain 306.

In another configuration, if the condition persists, the driving condition system disables the driving condition component when the vehicle 304 enters the autonomous mode. For example, upon entering the outdated map section 308, the driver or the driving component system may determine that the map is up-to-date and enable the autonomous mode. In this example, the vehicle 304 may still be in an area with rain 306, however, the driving condition component (e.g., windshield wipers) is disabled because the vehicle 304 is in the autonomous mode.

In yet another configuration, after navigating through the outdated map section 308, the vehicle 304 may re-enable the autonomous mode. The autonomous mode may be re-enabled based on a user input. Alternatively, the autonomous mode may be re-enabled when the vehicle 304 determines that it is no longer in an area with a stall factor. While the vehicle 304 is in the autonomous mode, the driver may enable the manual mode via a user input. The manual mode may be enabled based on the driver's desire to personally drive the vehicle 304.

In response to the user input to enable the manual mode, the driving condition system determines the current conditions. In the example of FIG. 3, the route 302 includes a potential fogging area 314. That is, the windows may not be fogged, yet, there is an increased potential for fogging. The window of the vehicle may fog when the external temperature is warmer than the internal temperature, or vice versa. The difference in temperature and the relative humidity of the exterior or interior of the vehicle may cause the windows to fog. The driving condition system determines the potential fogging area 314 by measuring internal and external temperature as well as internal and external humidity. Prior to entering the potential fogging area 314, the humidity and temperature may be obtained from an external source, such as the Internet.

In this example, if the driver enables the manual mode prior to, or while, the vehicle 304 navigates through the potential fogging area 314, the driving condition system prevents manual operation until the conditions are checked. The driving condition system may analyze the windows to determine if they are clear. The analysis may be performed with a vision sensor and/or a moisture sensor.

If the windows are clear, the driving condition system may allow the driver to proceed with the manual operation while the driving condition components are disabled. In another configuration, the windows may be clear, still, there may be potential cabin conditions (e.g., a potential for foggy windows). In this configuration, the driving condition system allows the driver to proceed with the manual operation after the window defrosters are enabled to prevent the anticipated window fogging.

In yet another configuration, if the windows are foggy, the driving condition system enables the window defrosters. In this example, the driving condition system allows the driver to proceed with the manual operation after the windows are cleared. The window defrosters may remain enabled until the vehicle leaves the potential fogging area 314, after the interior temperature is similar to the exterior temperature (e.g., there is no longer a potential for fogging), or after the windows are clear.

The driving condition components are not limited to windshield wipers and window defrosters. The driving condition components may include other components, such as the heater/cooler, headlight washers, sunshades, etc. For example, in addition to enabling the window defroster when the windows are foggy, the driving condition system may also enable the heater or cooler to adjust the internal temperature to prevent future fogging.

Figure 4:
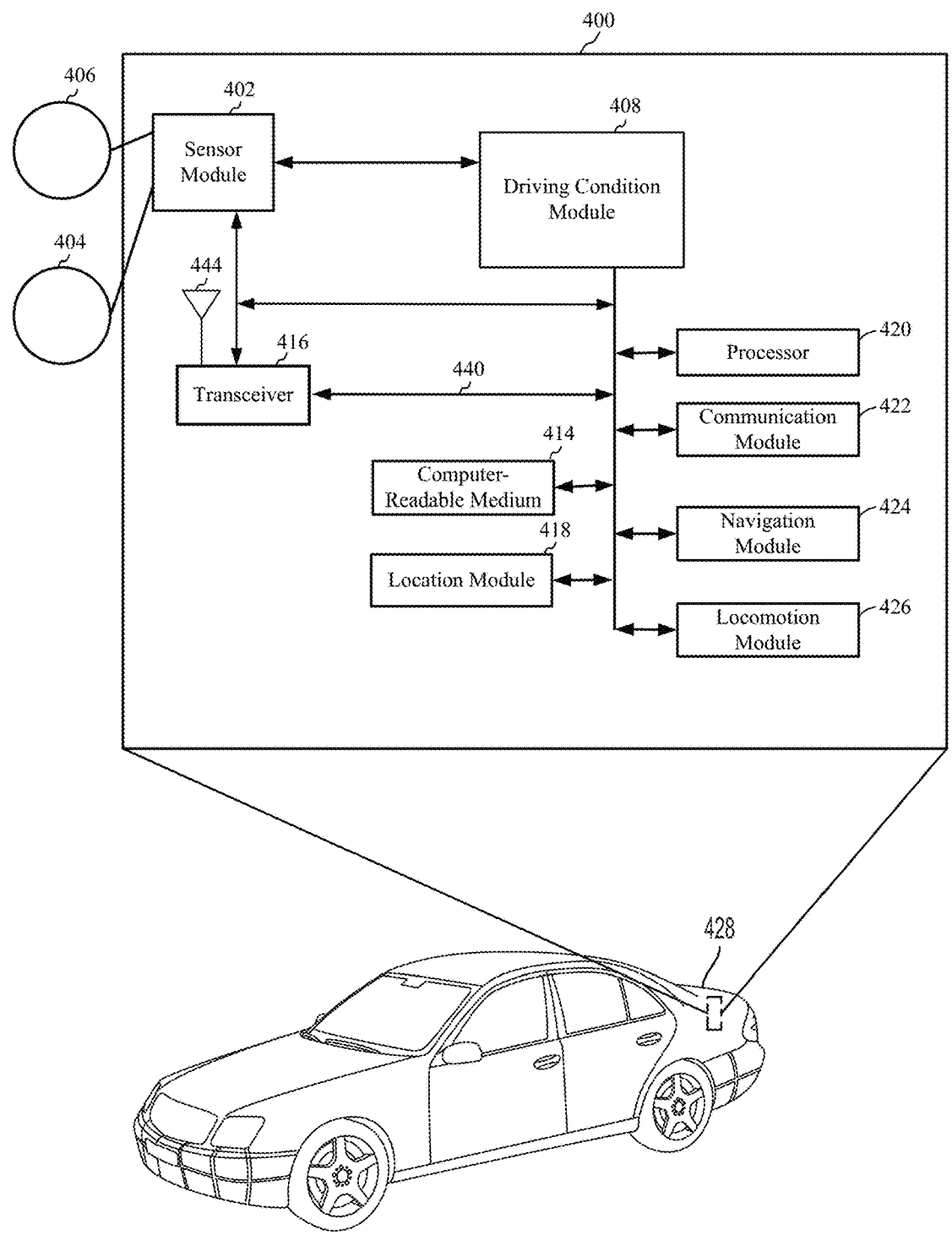
FIG. 4 is a diagram illustrating an example of a hardware implementation for a driving component system according to aspects of the present disclosure.

FIG. 4 is a diagram illustrating an example of a hardware implementation for a driving condition component adjustment system 400, according to aspects of the present disclosure. The driving condition component adjustment system 400 may be a component of a vehicle, a robotic device, or other device. For example, as shown in FIG. 4, the driving condition component adjustment system 400 is a component of a vehicle 428. The vehicle 428 may be an MAAS vehicle or a personal use vehicle. Aspects of the present disclosure are not limited to the driving condition component adjustment system 400 being a component of the vehicle 428, as other devices, such as a bus, boat, drone, or robot, are also contemplated for using the driving condition component adjustment system 400. The vehicle 428 may be autonomous or semi-autonomous. Furthermore, the vehicle 428 may be an electric vehicle, a hybrid vehicle, a fuel vehicle, or other type of vehicle.

The driving condition component adjustment system 400 may be implemented with a bus architecture, represented generally by a bus 440. The bus 440 may include any number of interconnecting buses and bridges depending on the specific application of the driving condition component adjustment system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The driving condition component adjustment system 400 includes a transceiver 416 coupled to the processor 420, the sensor module 402, a driving condition module 408, the communication module 422, the location module 418, the locomotion module 426, the navigation module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information from the driving condition module 408 to a server (not shown).

The driving condition component adjustment system 400 includes the processor 420 coupled to the computer-readable medium 414. The processor 420 performs processing, including the execution of software stored on the computer-readable medium 414 providing functionality according to the disclosure. The software, when executed by the processor 420, causes the driving condition component adjustment system 400 to perform the various functions described for a particular device, such as the vehicle 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be an internal vision sensor, such as a stereoscopic camera or a red-green-blue (RGB) camera, for capturing 2D images. The first sensor 406 may be used to determine environmental conditions (e.g., rain) or cabin conditions (e.g., foggy windshield). The first sensor 406 may also be an internal climate sensor used for determining internal temperature and/or humidity. The second sensor 404 may be an external climate sensor used for determining temperature, humidity, and/or other climate components. Of course, aspects of the present disclosure are not limited to the aforementioned sensors as other types of sensors, such as, for example, LIDAR, RADAR, sonar, and/or lasers are also contemplated for either of the sensors 404, 406. Furthermore, additional internal and/or external sensors may be specified. For example, a water sensor may be defined on the windshield.

The measurements of the first sensor 406 and the second sensor 404 may be processed by one or more of the processor 420, the sensor module 402, the driving condition module 408, the communication module 422, the location module 418, the locomotion module 426, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the driving condition component adjustment system 400.

The locomotion module 426 may be used to facilitate locomotion of the vehicle 428. As an example, the locomotion module 426 may control movement of the wheels. As another example, the locomotion module 426 may be in communication with a power source of the vehicle 428, such as an engine or batteries. Of course, aspects of the present disclosure are not limited to providing locomotion via wheels and are contemplated for other types of components for providing locomotion, such as propellers, treads, fins, and/or jet engines.

The driving condition component adjustment system 400 also includes the navigation module 424 for planning a route or controlling the locomotion of the vehicle 428, via the locomotion module 426. A route may be planned to a passenger based on compartment data provided via the driving condition module 408. In one configuration, the navigation module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The driving condition module 408 may be in communication with the sensor module 402, the transceiver 416, the processor 420, the communication module 422, the location module 418, the locomotion module 426, the navigation module 424, and the computer-readable medium 414. In one configuration, the driving condition module 408 receives sensor data from the sensor module 402. The sensor module 402 may receive the sensor data from the first sensor 406 and the second sensor 404. According to aspects of the present disclosure, the sensor module 402 may filter the data to remove noise, encode the data, decode the data, merge the data, extract frames, or perform other functions. In an alternate configuration, the driving condition module 408 may receive sensor data directly from the first sensor 406 and the second sensor 404.

In one configuration, the driving condition module 408 determines the current conditions based on information from the sensors 404, 406, the processor 420, the location module 418, the transceiver 416, the communication module 422, and/or the computer-readable medium 414. For example, the first sensor 406 may provide internal temperature and/or humidity. The second sensor 404 may provide external temperature and/or humidity. Additionally, the processor 420 and/or the computer-readable medium 414 may provide the status of comfort components and driving condition components, such as fan speed, air direction, seat heater/cooler, as well as other information, such as battery or gas levels. The location module 418 may provide the vehicle's 428 current location to the driving condition module 408. The transceiver 416 and/or the communication module 422 may be used to receive weather information from an external source, such as the Internet. The driving condition module 408 may determine a duration of the current conditions based on information obtained from the external source.

If the current conditions are likely to impair manual operation of the vehicle 428, the driving condition module 408 predicts a likelihood of the driver enabling a manual mode during the current conditions. The determination may be based on passenger information (e.g., driver information) obtained via the transceiver 416, the communication module 422, and/or the computer-readable medium 414. For example, the passenger information may be received from an external source when the passenger reserves the vehicle 428.

Additionally, the driving condition module 408 may predict the likelihood of the driver enabling the manual mode based on a potential for stalling along a route. The stall factor(s) may be determined by information obtained from an external source, such as the Internet, the transceiver 416, sensor data obtained from the sensor module 402, and/or map and environment data stored in the computer-readable medium 414 and/or a memory (not shown). For example, the driving condition module 408 may determine backlight conditions at intersections, the vehicle's 428 direction at intersections, the positions of traffic lights, the arrival time at intersections, the position of the sun, weather at the intersections, building information, as well as other factors.

If the driver is likely to enable the manual mode, the driving condition module 408 enables one or more driving condition components via the processor 420 and/or the computer-readable medium 414. The driving condition component may be selected based on detected conditions. Upon detecting that the conditions have been mitigated, the driving condition module 408 disables one or more driving condition components via the processor 420 and/or the computer-readable medium 414.

According to aspects of the present disclosure, the driving condition module 408 may be configured for determining whether current conditions would limit a driver's visibility, predicting whether the driver will enable a manual mode during the current conditions, and controlling the driving condition component to mitigate the current conditions prior to the driver enabling the manual mode. The driving condition module 408 may also be configured for predicting whether the driver will enable the manual mode based on a potential for stalling on a current route, a proximity of the autonomous vehicle to the driver's destination, a reservation status, and/or driver information. The driving condition module 408 may further be configured for determining the current conditions based on one or more of an internal climate sensor, an external climate sensor, weather data, an internal vision sensor, and/or an external vision sensor. The driving condition module 408 may further yet be configured for disabling the driving condition component after mitigating the current condition.

Figure 5:
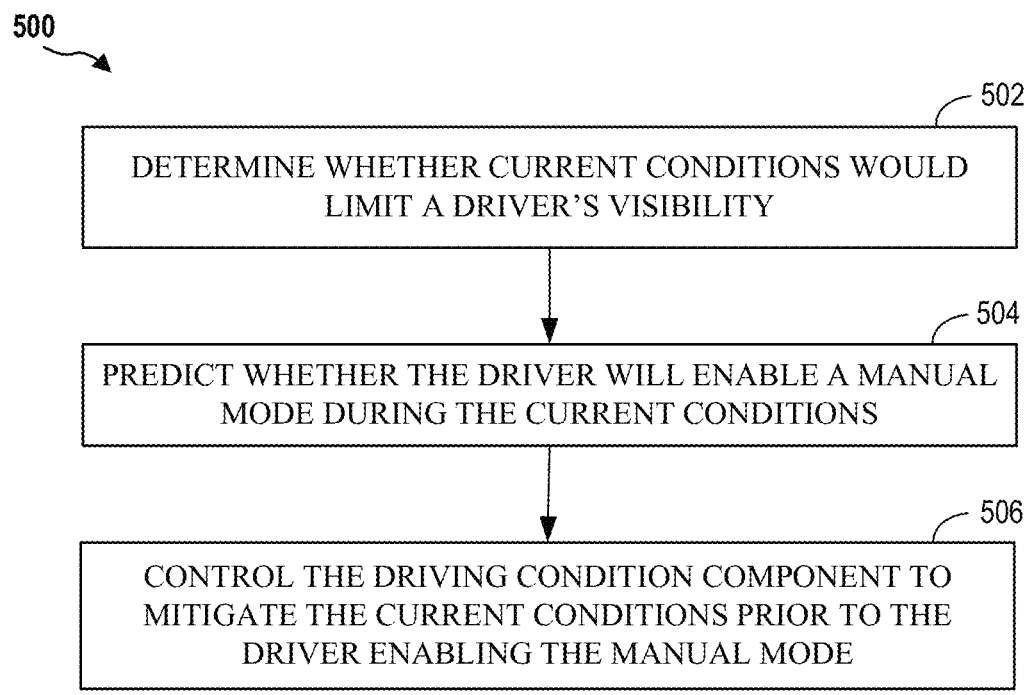
FIG. 5 illustrates a flow diagram for a method of controlling a driving condition component according to aspects of the present disclosure.

FIG. 5 illustrates a flow diagram 500 for controlling a driving condition component according to aspects of the present disclosure. As shown in FIG. 5, at block 502 a driving condition component adjustment system determines whether current conditions would limit a driver's visibility. The current conditions may be determined based an internal climate sensor, an external climate sensor, weather data, an internal vision sensor, an external vision sensor, and/or another sensor. Examples of conditions that limit the driver's visibility include, but are not limited to, rain, snow, and/or foggy windows.

At block 504, the driving condition component adjustment system predicts whether the driver will enable a manual mode during the current conditions. The manual mode may be enabled to override autonomous operation. The manual mode refers to a mode where the driver operates the vehicle. The prediction may be based on a potential for stalling on a current route, a proximity of the autonomous vehicle to the driver's destination, a reservation status, driver information, and/or another condition.

At block 506, the driving condition component adjustment system controls (e.g., activates) the driving condition component to mitigate the current conditions prior to the driver enabling the manual mode. Specifically, the driving condition component may mitigate the current conditions prior to, or during, manual operation. The driving condition component may include a window defroster, a heater, a cooler, and/or a windshield wiper. In an optional configuration, after the current conditions are mitigated, the driving condition component adjustment system deactivates the driving condition component. In one configuration, mitigating the current conditions refers to clearing a windshield of the autonomous vehicle.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a driving condition component of a vehicle, comprising:
    enabling an autonomous mode for the vehicle;
    disabling automatic operation of the driving condition component based on a current condition in response to enabling the autonomous mode;
    determining, while the vehicle is operating in the autonomous mode, the current condition limits visibility for a human occupant of the vehicle;
    predicting the human occupant will enable a manual mode during the current condition; and
    enabling the driving condition component to mitigate the current condition prior to the human occupant switching from the autonomous mode to the manual mode.

2. The method of claim 1, further comprising predicting the human occupant will enable the manual mode based on at least one of a potential for stalling on a current route, a proximity of the vehicle to a destination, a reservation status, human occupant information, or a combination thereof.

3. The method of claim 1, further comprising determining the current condition based on at least one of an internal climate sensor, an external climate sensor, weather data, an internal vision sensor, an external vision sensor, or a combination thereof.

4. The method of claim 1, in which the current condition comprises at least one of rain, snow, foggy windows, or a combination thereof.

5. The method of claim 1, in which the driving condition component comprises a window defroster, a heater, a cooler, or a windshield wiper.

6. The method of claim 1, further comprising deactivating the driving condition component after mitigating the current condition.

7. The method of claim 1, in which mitigating the current condition comprises clearing a windshield of the vehicle.

8. An apparatus for controlling a driving condition component of a vehicle, the apparatus comprising:
    a memory; and
    at least one processor coupled to the memory, the at least one processor configured:
        to enable an autonomous mode for the vehicle;
        to disable automatic operation of the driving condition component based on a current condition in response to enabling the autonomous mode;
        to determine, while the vehicle is operating in the autonomous mode, the current condition limits visibility for a human occupant of the vehicle;
        to predict the human occupant will enable a manual mode during the current conditions; and
        to enable the driving condition component to mitigate the current conditions prior to the human occupant switching from the autonomous mode to the manual mode.

9. The apparatus of claim 8, in which the at least one processor is further configured to predict whether the human occupant will enable the manual mode based on at least one of a potential for stalling on a current route, a proximity of the vehicle to a destination, a reservation status, human occupant information, or a combination thereof.

10. The apparatus of claim 8, in which the at least one processor is further configured to determine the current condition based on at least one of an internal climate sensor, an external climate sensor, weather data, an internal vision sensor, an external vision sensor, or a combination thereof.

11. The apparatus of claim 8, in which the current condition comprises at least one of rain, snow, foggy windows, or a combination thereof.

12. The apparatus of claim 8, in which the driving condition component comprises a window defroster, a heater, a cooler, or a windshield wiper.

13. The apparatus of claim 8, in which the at least one processor is further configured to deactivate the driving condition component after mitigating the current condition.

14. The apparatus of claim 8, in which mitigating the current condition comprises clearing a windshield of the vehicle.

15. A non-transitory computer-readable medium having program code recorded thereon for controlling a driving condition component of a vehicle, the program code executed by a processor and comprising:

program code to enable an autonomous mode for the vehicle;

program code to disable automatic operation of the driving condition component based on a current condition in response to enabling the autonomous mode;

program code to determine, while the vehicle is operating in the autonomous mode, the current condition limits visibility for a human occupant of the vehicle;

program code to predict the human occupant will enable a manual mode during the current condition; and program code to enable the driving condition component to mitigate the current condition prior to the human occupant switching from the autonomous mode to the manual mode.

16. The non-transitory computer-readable medium of claim 15, in which the at least one processor is further configured to predict whether the human occupant will enable the manual mode based on at least one of a potential for stalling on a current route, a proximity of the vehicle to a destination, a reservation status, human occupant information, or a combination thereof.

17. The non-transitory computer-readable medium of claim 15, in which the at least one processor is further configured to determine the current condition based on at least one of an internal climate sensor, an external climate sensor, weather data, an internal vision sensor, an external vision sensor, or a combination thereof.

18. The non-transitory computer-readable medium of claim 15, in which the current condition comprises at least one of rain, snow, foggy windows, or a combination thereof.

19. The non-transitory computer-readable medium of claim 15, in which the driving condition component comprises a window defroster, a heater, a cooler, or a windshield wiper.

20. The non-transitory computer-readable medium of claim 15, in which the at least one processor is further configured to deactivate the driving condition component after mitigating the current condition.

* * * * *